Oct. 27, 1970 P. BIZET 3,536,841

MULTIPLEXING METHOD AND SYSTEMS

Filed Nov. 21, 1967 3 Sheets-Sheet 1

INVENTOR:
PIERRE BIZET

BY: Craig & Antonelli

ATTORNEYS

INVENTOR:
PIERRE BIZET

BY: Craig & Antonelli
ATTORNEYS

Oct. 27, 1970 P. BIZET 3,536,841

MULTIPLEXING METHOD AND SYSTEMS

Filed Nov. 21, 1967 3 Sheets-Sheet 3

INVENTOR:
PIERRE BIZET

BY:

ATTORNEYS

United States Patent Office 3,536,841
Patented Oct. 27, 1970

3,536,841

MULTIPLEXING METHOD AND SYSTEMS

Pierre Bizet, Fontenay-aux-Roses, France, assignor to C.I.T.-Compagnie Industrielle des Telecommunications, Paris, France, a corporation of France Filed Nov. 21, 1967, Ser. No. 684,712
Claims priority, application France, Nov. 22, 1966, 84,560
Int. Cl. H04b 1/66
U.S. Cl. 179—15.55 12 Claims

ABSTRACT OF THE DISCLOSURE

Method of time multiplexing for signals arriving on $n$ telegraphic channels, wherein, in an operating cycle which lasts for a time interval $\theta$, evenly distributed under said $n$ channels, the duration of a signal train arriving from a channel during a time interval $\theta$ is reduced to a duration $\theta/x$, smaller than $\theta/n$, a signal of same polarity as the first signal of said signal train being added on the beginning of the train, and a signal of same polarity as the last signal of the train being added to the end of the train, in order to avoid the necessity of transmitting too short signals at the moment of transition from a channel to the text.

The present invention relates to a chronological multiplexing method of telegraphic transmission, based upon a chronological combining of several messages coming from several lines for transmission on a single line.

In a system of this nature, the signals coming from several telegraphic lines are transmitted simultaneously over a single telephonic link which is made available to them sequentially. In principle, the system employed for $n$ telegaphic lines comprises a distributor comprising $n$ terminals which sequentially feed a modulator with the signals produced by $n$ receiver-converters from the signals received on the $n$ lines. The modulator transmits the multiplexed signals on a telephonic line. At the receiving end of the telephonic line, a demodulator reconstitutes the signals which are fed to a second distributor comprising $n$ terminals connected to a second set of converters which operate in the opposite sense to that of the preceding converters and retransmit the $n$ messages on $n$ telegraphic lines.

The two distributors should be synchronized perfectly to provide proper operation, which may be ensured by means of an auxiliary system equipped with positive control elements.

In some known systems, the operation of the converters is based on analysis of the telegraphic signals received, when considered as characters forming a specific alphabet, that is to say, according to a rigidly established code. These elements are thus arranged to operate only at a strictly defined telegraphic speed with coded signals corresponding to this alphabet, with the number of moments or intervals defined in a unique manner. This feature applies a troublesome restriction in the case, which is an important one in practice, in which signals corresponding to a different coding method may appear on a telegraphic line, according to the connections established. This case arises in particular in automatic telephone networks employing a numbering system for telephonic dialling to call subscribers, which calling device imposes application of a different code from that employed for transmission of the messages. It is said that such systems, which operate at a single telegraphic speed, are not "transparent."

This restriction does not arise in other kinds of multiplex devices, employing subdivision of the frequency band of the telephone line into component bands of uniform width, standardized at 120 Hz. These systems known as "harmonic telegraphy" systems, ensure transmission of all signals irrespective of their coding, provided their duration is no shorter than a limiting period. Such systems are referred to as being "transparent." These are multiplex frequency systems however, which entail a certain complexity of equipment, specifically owing to required filtering devices.

The present invention aims to provide a method which renders it possible to construct chronological multiplexing systems possessing the property of so-called "transparency." It is based on a particular contruction of the converters co-ordinated with the receivers and of the converters co-ordinated with the retransmitters.

According to the invention, in a chronological multiplex method of telegraphic transmission comprising $n$ lines, in which a distributor performing complete scanning of all the lines in a time $\theta$ rests on each line terminal for a time $\theta/n$, the signals received at the input extremity of a telephonic line during a period of $\theta=KT$, in which K is a greater number than 1 and T is the duration of the shortest significant interval on the telegraphic lines, are recorded in an auxiliary memory unit and then returned in a time $KT/x$, $x$ being greater than $n$, $T/X$ preferably being the shortest interval transmissible by a modulator and a demodulator co-ordinated with the telephonic line.

During multiplex reception, the signals coming from the telegraphic line numbered $i$ and recorded in the memory unit of the co-ordinated converter, which may be a magnetic tape for example, are retransmitted after signals coming from the telegraphic line numbered $i-1$, before those of the line numbered $i+1$, and so on, in circular permutation. Unless precautions are taken in a method of this kind, a risk of disturbances arises between adjacent signals on passing from one telegraphic line to the next. In point of fact, two characteristic instants may be situated very close to each other on two wholly independent telegraphic lines, so that there is a risk of the distributor—on passing from one telegraphic line to the next—receiving a signal of shorter duration than T, resulting in a signal of shorter duration than $T/X$ from the modulator, that is to say, outside the permissible limits.

According to another feature of the invention, the aforesaid memory unit employed in multiplex transmission comprises devices which, prior to retransmission of a message received during an interval $\theta=KT$ and retransmitted during an interval $$\frac{\theta}{X}=\frac{KT}{x}$$

are arranged to cause the transmission of the first valency of the said message extended during a time $T/x$, and after retransmission of the said message, the transmission of the final valency equally extended by a period $T/x$.

In this way, instead of direct feed of the signals converted following the distributor to a modulator, the multiplex transmission converter causes these to be preceded by a "guard" signal of a duration $T/x$ whose polarity indicates that of the first signal to be transmitted; and it causes the last signal converted at the end of a time $$K\frac{T}{x}$$

to be followed by another guard signal extending its duration by an interval $T/X$. The signals converted are thus flanked by signals whose duration cannot be shorter than $T/X$. Passage of the distributor from one terminal to the next thus cannot evoke signals of shorter duration than $T/x$.

During multiplex reception, the guard signals should not be retransmitted to the telegraphic retransmission lines. The retransmission converters are arranged in such a manner as to suppress these, and to retransmit a series of signals which represent the true reproduction of the cording each message transmitted on the telephonic line A reception converter comprises a memory unit recording each message transmitted on the telephonic line during a time $\theta/n$ and fed to one of the telegraphic retransmission lines by the multiplex reception distributor synchronized with the transmission distributor. The informative signals recorded in the memory unit of the said reception converter are transmitted by the latter to the said telegraphic line under exclusion of the guard signals, this retransmission occurring in a time KT.

On the telephonic line, the period $$\frac{\theta}{n}=\frac{KT}{n}$$

of transmission of a message intended for a telegraphic line, comprises a time alloted to the informative signals to $KT/x$, increased by two guard periods of $T/x$ each. The following equation is thus obtained:

$$\frac{KT}{n}=\frac{KT}{x}+\frac{2T}{x}$$

This leads to the relationship:

$$K=\frac{2n}{x-n}$$

To clarify matters, an example may be given for a system of twenty-our telegraphic lines operating at the speed of 50 bauds, employing a modulator and a demodulator operating at the speed of 1500 bauds.

The following then applies: $n=24$; $T=1/50$ sec.=20 milliseconds: $T/X=1/1500$, with $x=30$;

$$K=\frac{48}{30-24}=8$$

$=8\times20=160$ milliseconds.

The memorizing device of a reception converter should be suitable to record the signals appearing at the end of a telegraphic line during a period $\theta-KT=160$ milliseconds, then to reproduce them in a time $KT/x=5.38$ milliseconds, while causing these to be preceded and followed by a guard interval of 0.66 millisecond, amounting to a total period of memorization of 6.66 milliseconds, or ten periods of 0.666 ms.

The memorizing device of a retransmission converter records the signals appearing on the telephonic line for 6.66 ms., extracts useful signals covering 5.33 ms., and retransmits these within a period of 160 ms. on the telegraphic retransmission line of the same order as the transmission line.

The invention will now be described in detail with reference to the acompanying drawings, which show an embodiment of the invention, but in no restrictive sense.

FIG. 1 illustrates the block diagram of a chronological multiplexing telegraphic system according to the invention.

FIG. 2 essentially represents a schematic diagram showing the relationship between the values on reception, the values occurring within the system and the values on retransmission.

Figure 1:
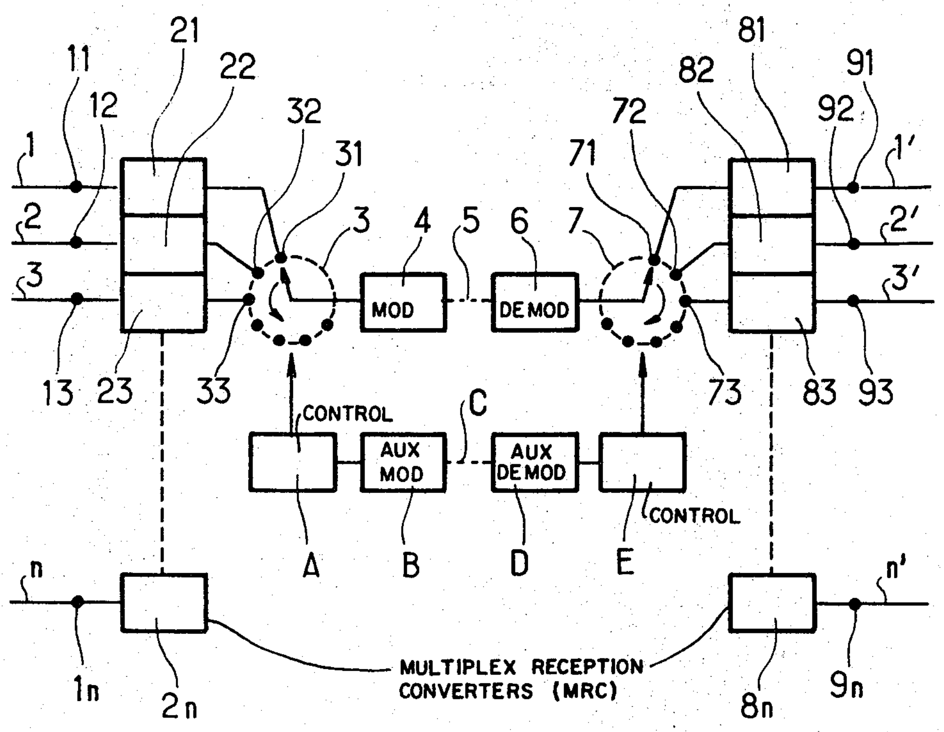

In FIG. 1, $n$ telegraphic lines 1, 2 . . . $n$, $n$ being 24 for example, are connected by terminals 11, 12 . . . 1$n$, to multiplex reception converters 21, 22 . . . 2$n$ of which each is allocated to one line. Reference numeral 3 denotes a distributor comprising $n$ terminals 31, 32 . . . 3$n$, which sequentially collect the items of information produced by the reception-converters from the telegraphic signals. 4 is a modulator which feeds these items of information through a single telephonic line 5 to a demodulator 6, as a rule by modulation of a carrier wave, the demodulator 6 feeds demodulated signals to a distributor 7 comprising $n$ terminals 71, 72 . . . 7$n$, which transfers the item of information transmitted in sequence to multiplex reception converters 81 82 . . .8$n$, which causes corresponding telegraphic signals to be emitted on telegraphic retransmission lines 1′, 2′ . . . $n'$ connected to the corresponding terminals 91, 92 . . . 9$n$.

In principle, the distributors 3 and 7 are synchronized perfectly, so that it may be envisaged that the output of the transmission converter 21 is connected cyclically to the input of the reception converter 81, then the output of the transmission converter 22 to the input of the reception converter 82, and thus in sequence, so that the reproduced signals fed to each of the terminals 91, 92 . . . 9$n$ are identical to the corresponding signals reaching the terminals 11, 12 . . . 1$n$.

The synchronization of the distributors 3 and 7 may be established by means of positive control elements (A) and (E), for example co-ordinated through an auxiliary modulator (B), an auxiliary connection (C) and an auxiliary demodulator (D).

Figure 2:
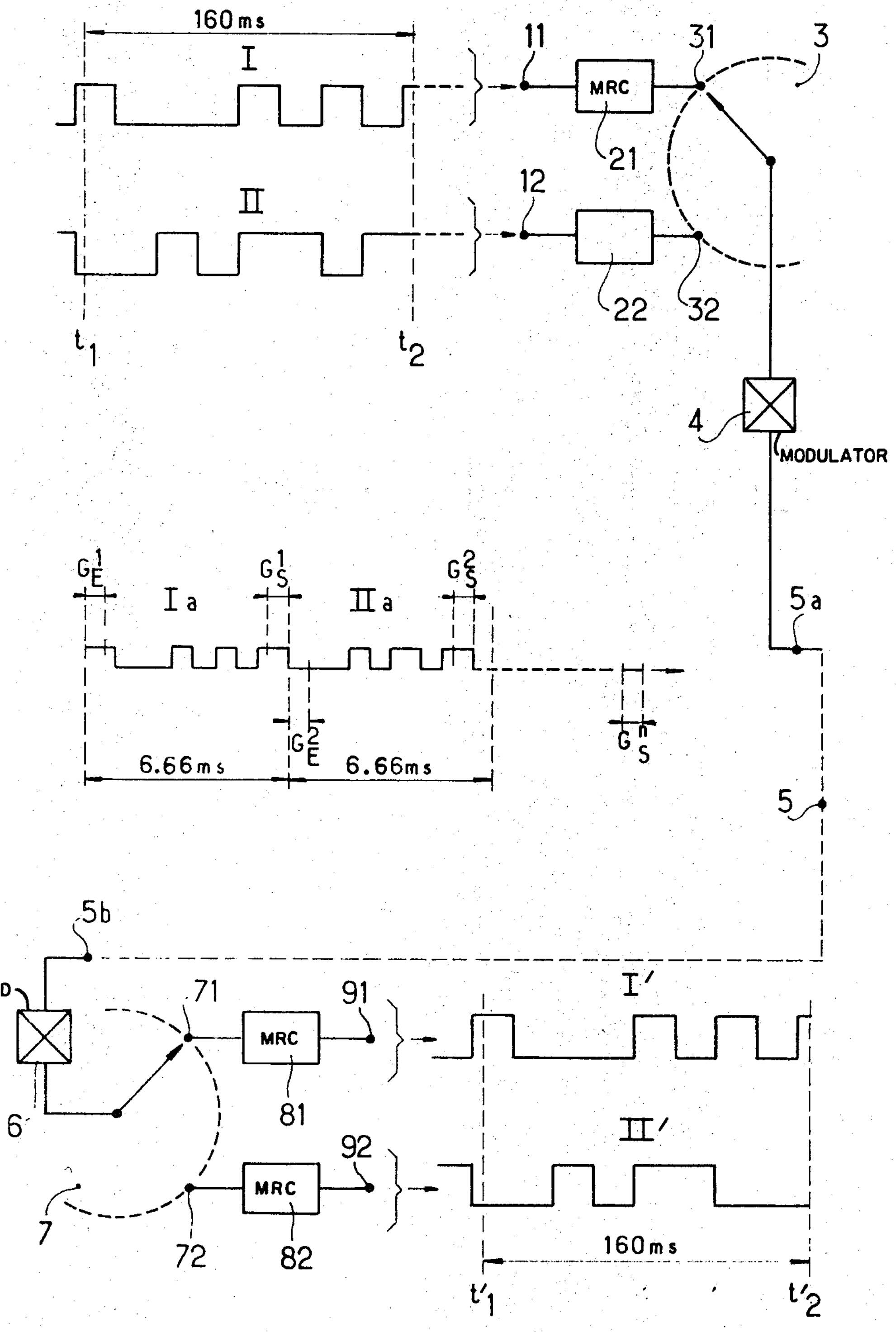

FIG. 2 essentially represents a chronological diagram with two time scales intended to depict some elements taken from FIG. 1 to demonstrate the relationships between the said operations. As an example, a case will be considered in which a signal is fed to the transmission converter 21 by way of the terminal 11 and another signal is fed to the converter 22 by way of the terminal 12. The distributor feeds the signals produced by the elements 21 and 22 to the modulator 4 which feeds these through a terminal 5$a$ to the input of the telephonic line.

On issuing from the telephonic line, the signals are fed through a terminal 5$b$ to the demodulator 6, and the demodulated signals are fed through reception converters 81, 82 . . . to terminals 91, 92 . . . on which appear the original telegraphic signals.

The incoming telegraphic signals are illustrated at I and II corresponding to the two lines. The signals I received between the time $t_1$ and $t_2$ separated by 160 ms., are converted in the transmission converter 21 into signals I$a$ of a duration of 5.33 ms., whereof the first is lengthened on arrival by a guard interval $G_E^1$ of the same polarity of a duration of 0.666 ms., and whereof the last one is extended on departure by a guard interval $G_S^1$ of the same polarity and the same duration. These three signals, having a total duration of 6.66 ms. are received on the terminal 31 by the distributor 3 whose cursor dwells on this contact terminal for the same period 160/24=6.66 ms.

Analogously, the signal II is converted by the converter 22 into a signal II$a$ of a duration of 5.33 ms., preceded and followed by the two corresponding guard signals $G_E^2$ and $G_S^2$, and all these signals, up to the including those of the line 2$n$, being fed to the terminal 5$a$ of the telephonic line 5. The time which separates the beginning of the leading guard signal $G_E^1$ from the end of the trailing guard signal $G_S^2n$ of the line 2$n$ amounts to 160 ms.

The signals I$a$ are reproduced on the telegraphic retransmission lines by means of the distributor 7 and of the reception converters 81, 82 in the form of signals I′, II′ which are correspondingly retransmitted between time $t_1'$ and $t_2'$ separated by 160 ms.

Figure 3:
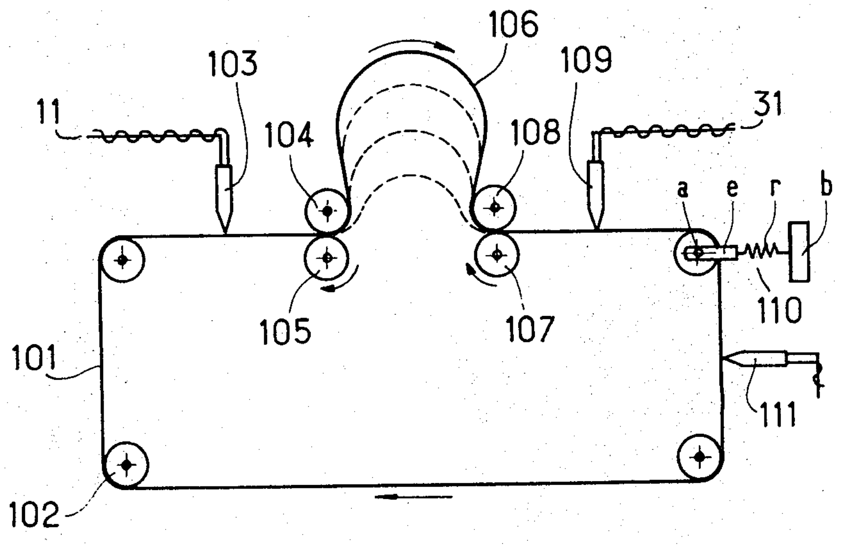
FIG. 3 is a diagram of a reception-conversion device.
Figure 4:
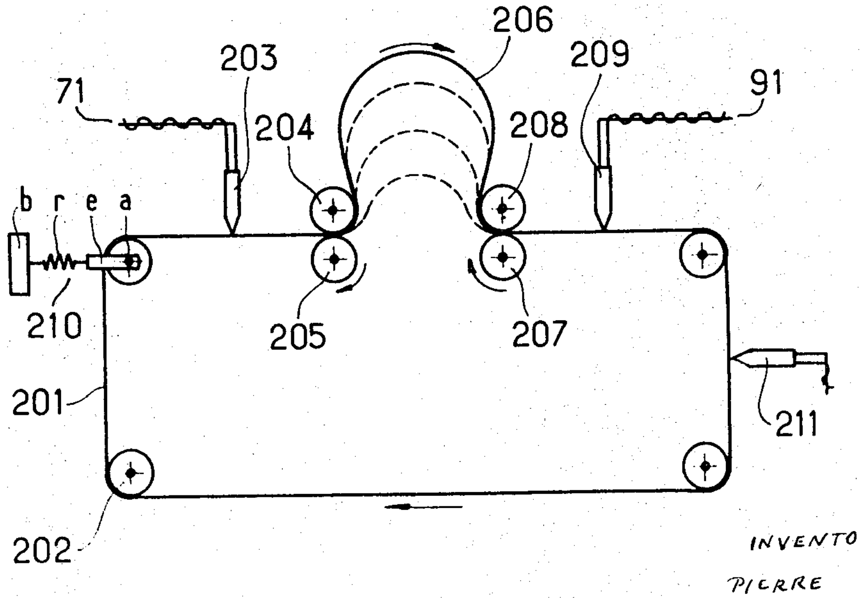
FIG. 4 is a diagram of a conversion-retransmission device.

By way of non-limting example, FIG. 3 and 4 illustrate an embodiment of the multiplex transmission converters and of the multiplex reception converters according to the invention.

As may be seen from FIG. 3, each transmission converter comprises an endless magnetic tape 101 driven by a first roller 105 running at a high constant speed $y$. The tape gripped between the roller 15 and a pinch roller 104 has a uniform speed V at this point. Another roller 107 which can very quickly reach a speed $xy$, turns intermittently. The tape 101 gripped between the roller 107 and a pinch roller 108 intermittently acquires the speed $x$V at this point, and the tape forms a loop between the pair of rollers 104–105 and the pair of rollers 107–108, which represents the speed variations of the dicerent portions of the tape. The tension of the tape is assured by three rollers 102, and a tensioning roller 110 comprising a pin $a$, a yoke or clevis $e$ traversed by the said pin, a spring $r$ fastened at one end to the yoke and at the other to a fixed point $b$.

A magnetic recording head 103 connected to the point of arrival of a telegraphic line, for example to the terminals 11 illustrated by a single point in FIGS. 1 and 2, records signals coming from a telegraphic line, being the input line 1 in this case, on the tape 101 before the loop 106. A so-called "playback" or reproduction head 109 connected to the double terminal 31 of the distributor 3 reads off the signals on the tape 101 after the loop 106.

Each converter comprises a head 111 for erasure of the multiplex reception signals, and the apparatus of FIG. 4 has an analogous layout, in which correspnding elements bear numerical references increased by 100. The head 203 is connected to the double terminal of the distributor 7, the head 208 to the double terminal 91 which is the start of the telegraphic retransmission line 1'.

The roller 205 intermittently rotates at the speed $xy$ imparting a speed $x$V to the tape, the roller 207 rotates permanently at a speed $y$, imparting a constant speed V to the tape. A head 211 is employed for "wiping" or erasing the tape.

During multiplex transmission, the head 103 permanently records the signals coming from the reception line 1.

At the beginning of a cycle of duration KT, synchronized by the distributor 3, the roller 107 is stopped during a first stage of duration $$KT-\frac{KT}{n}$$

During this time, the head 109 is not connected to the modulator, to which it is connected during the rest of the cycle. This period is followed by a second stopping period of duration $T/x$ during which the leading guard interval ($G_E^1$) is established. Progression and playback occur during a third period of duration $KT/x$. This period corresponds to transmission to the modulator 4 of the telegraphic signals received at the terminal 11 during a period KT. Recording and stoppage occur during a fourth period of duration $KT/x$ to establish the trailing guard interval ($G_S^1$). The total period of playback amounts to $$\frac{KT}{n}=\frac{KT}{x}+\frac{2T}{x}$$

according to the preceding definitions.

The head 109 should be appropriate for reading the signals when stopped. Such magnetic heads are known, being a head for example, which contains a small plate of a substance possessing the Hall effect. It will be recalled that a reading or scanning head of this nature comprises a magnetic circuit in which is placed a small rectangular plate of this kind which is traverse between two parallel sides by a direct current supplied by a source of current connected to the said sides and has a difference of potential between the two other sides if the magnetic circuit is traversed by a magnetic flux. Between two terminals connected to the said other two sides there appears a potential difference whose polarity depends on the direction of magnetic flux, being zero when the flux is zero. This phenomenon occurs in the static condition. A head of this nature thus will provide a signal at zero speed of the corresponding tape, contrary to an induction head, which is sensitive only to flux variation, that is to say, in the case of telegraphic signals, to the variation engendered by the displacement of the tape.

In the reception converter, the roller 205 rotates for a period $KT/x$ during a cycle of duration KT. During this time, the head 203 is connected through the distributor 7 to the output of the demodulator 6 in such manner as to record only the informative signals, excluding the guard signals. The roller 207 rotating permanently, the signals recorded on the tape during the fast rotation of the roller 205 are retransmitted by the head 209 during a cycle of duration KT. The two heads 203 and 209 may be of the conventional induction type.

Finally, the signals entering at 11 during a period KT are retransmitted at 91 during a period of the same duration KT.

The method of recording the telegraphic signals on reception and of playback on retransmission has been set forth in detail for the signals entering from the line 1 and retransmitted on the line 1'. From the preceding, it is plain that the signals retransmitted on the line 1' are the true reproduction of the signals entering through the line 1. The same result is evidently accomplished with all lines co-ordinated in pairs.

Owing to the arrangement of the description, the guard signals on the one hand prevent transmission of signals of too short a duration to be accepted by the apparatus and the telephonic lines, and on the other hand retransmission is not disturbed by the presence of the guard signals which are suppressed at the starting point of the retransmisson lines.

Control over the periods of advance of the rollers 107 of FIG. 3 and 205 of FIG. 4 is synchronized by means of the corresponding distributors 3 and 7, which in their turn are synchronized with each other as set forth in the preceding.

Analogously, the periods of playback by the head 109 and of recording by the head 203 are controlled by means of the corresponding distributors 3 and 7. The corresponding control devices do not form part of the invention, they are well known to one versed in the art, and therefore a specific description thereof has been omitted to avoid confusion as to the identification of the inventive features.

The preceding device has been described by way of example only, and other forms of embodiment are possible within the scope of the invention as defined in the appended claims.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

In the claims:

1. In a method for chronological multiplexing of a plurality of signals received on $n$ lines for application to a single transmission line including distributor means for successively applying signals from said $n$ lines to said transmission line during each constant time period $\theta$, the improvement essentially consisting of reducing the duration of the signal of duration $\theta$ on each line to a duration less than $\theta/n$, adding to each signal a leading signal of the same polarity as the leading term of the signal to which it is added, adding to each signal a trailing signal of the same polarity as the trailing term of the signal to which it is added, the duration of the composite signal composed of said reduced signal with said leading and trailing signals added thereto amounting to a duration of $\theta/n$, and applying said composite signals to said distributor means.

2. The method as defined in claim 1 for further including the steps of separating said composite signals at the output of said transmission line, depleting said leading and trailing signals, and expanding said reduced signals to a duration $\theta$.

3. The method as defined in claim 1 wherein the duration $\theta/n$ is equal to $$\frac{KT}{x}+\frac{2T}{x}$$

T being the shortest signal duration capable of being received on said lines, K being equal to $$\frac{2n}{x-n}$$

and $x$ being an integer greater than $n$, the period $KT/x$ being the duration of the reduced signal and the period $2T/x$ being the sum of the durations of said leading and trailing signals.

4. In a system for chronological multiplexing of a plurality of signals received on $n$ lines for application to a single transmission line including first distributor means for successively applying signals from said $n$ lines to said transmission line during each time period $\theta$, the improvement essentially consisting of convertor means connected between each line and said distributor means comprising first means for continuously recording a signal received via a respective line at a first speed second means for intermittently transcribing the recording of said signal by said first means at a second speed faster than said first speed, and control means for controlling the intermittent operation of said second means so as to add to the transcribed signal leading and trailing signal portions having the same polarity adjacent portions of the signal to which they are added.

5. The combination defined in claim 4 wherein said first means is provided in the form of a dynamic recording member capable of recording only during moving of the recording medium with respect thereto and said second means is provided in the form of a static transcribing member capable of producing a signal when the recording medium is stationary as well as when it is moving.

6. The combination defined in claim 4, further including modulation means connected between said first distributor means and said transmission line for modulating the signal applied thereto.

7. The combination defined in claim 4, wherein said first means includes a magnetic recording head and a magnetic tape.

8. The combination defined in claim 7 wherein said magnetic tape is provided as an endless loop, said first means includes first drive means for driving said tape continuously at said first speed, and said second means includes drive means for driving said tape intermittently at said second speed.

9. The combination defined in claim 6 wherein said multiplexing system also includes additional distributor means at the output of said transmission line and synchronized with said first distributor means for separating the signal from said transmission line for application to $n$ additional lines, and further including re-convertor means comprising third means for intermittently recording the signal from said transmission line at said second speed, fourth means for continuously transcribing the signal recorded by said third means at said first speed, and control means for controlling the intermittent operation of said third means so as to delete from the transcribed signal all leading and trailing signal portions.

10. The combination defined in claim 9 wherein said third and fourth means include dynamic magnetic recording and transcribing heads, respectively, and a magnetic tape.

11. The combination defined in claim 10 wherein said magnetic tape is formed as an endless loop, said third means including third drive means for driving said tape intermittently at said second speed, and said fourth means including fourth drive means for driving said tape intermittently at said first speed.

12. The combination as defined in claim 9 further including demodulation means connected between said transmission line and said additional distributor means for modulating the signal applied thereto.

References Cited

UNITED STATES PATENTS

| | | | |
|---|---|---|---|
| 3,256,389 | 6/1966 | Ehrich | 179—15 |
| 3,042,751 | 7/1962 | Graham | 179—15 |

KATHLEEN H. CLAFFY, Primary Examiner

T. J. D'AMICO, Assistant Examiner